E. F. STODDARD.
FASTENINGS FOR SECTIONAL RATCHET WHEELS.

No. 176,150. Patented April 18, 1876.

Witnesses:
Chas. M. Peck
Luther Peters

Inventor:
E. Fowler Stoddard
by his Attys.
Peck & Co.

UNITED STATES PATENT OFFICE.

E. FOWLER STODDARD, OF DAYTON, OHIO, ASSIGNOR TO JOHN W. STODDARD & CO., OF SAME PLACE.

IMPROVEMENT IN FASTENINGS FOR SECTIONAL RATCHET-WHEELS.

Specification forming part of Letters Patent No. 176,150, dated April 18, 1876; application filed March 31, 1876.

*To all whom it may concern:*

Be it known that I, E. FOWLER STODDARD, of Dayton, in the county of Montgomery and State of Ohio, have invented certain new and useful Improvements in Fastenings for Sectional Ratchet-Wheels; and I do hereby declare the following to be a full, clear, and exact description of the same.

This invention relates to that class of ratchet or other wheels which are made in sections and bolted together upon the driving-shaft; and my object is to provide a simple and secure method of keying or securing the wheel upon the shaft, to prevent its displacement.

The nature of my improvement consists in boring through the shaft from side to side, and placing in the orifice a steel pin, whose projecting ends enter orifices made to receive them in the hub of the wheel.

To enable others skilled in the art to which my invention appertains to make and use the same, I would thus proceed to describe it, referring to the accompanying drawings, in which—

Figure 1:
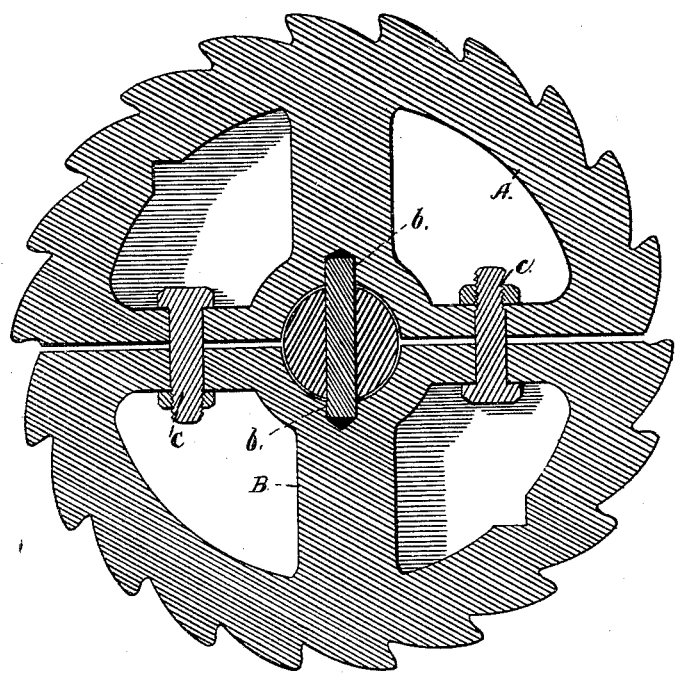
Figure 2:
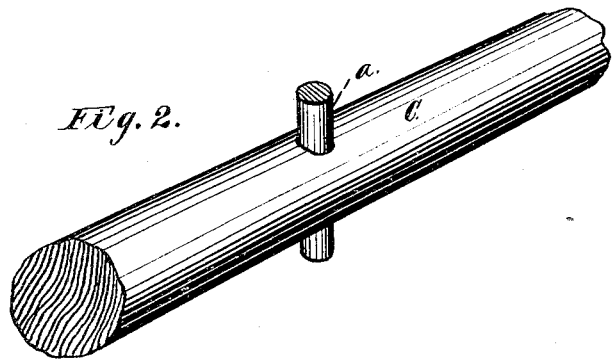

Figure 1 is a central section of a ratchet-wheel, taken through the plane of its revolution, and secured upon a shaft by my improved fastening. Fig. 2 is the perspective view of the portion of a shaft, showing the arrangement of the fastening-pin.

Corresponding letters of reference indicate like parts in both figures.

A B represent the two half-sections of a ratchet-wheel. C, Fig. 2, is any iron shaft, having an orifice drilled or otherwise formed through it from side to side, and in which is fitted a steel pin, $a$, with its ends projecting, as seen. Each section of the wheel is then fitted upon the shaft, so that the projecting ends of the pin enter orifices $b$ in the hub of the wheel. Bolts $c$, passed through the contiguous ribs of the sections, secure them and firmly clamp them upon the shaft.

An iron pin would perform the same office as a steel pin, though for durability I much prefer the latter.

Instead of boring entirely through the shaft, orifices might be made from each side, and short pins be used in the same manner; or a single pin not passing through the shaft might be employed, though I have stated above what I consider the simplest, and at the same time the most durable, method of fastening.

I am aware that ratchet and other wheels have been made in sections and bolted together, as I have herein represented one; and that a nib or projection has been cast with the wheel on the inner side of the hub, to fit in a slot or groove in the shaft; but such method of fastening is often rendered very insecure by flaws in the cast-iron, which, were it perfect, would hardly be sufficient to bear great strain. Again, should the nib be broken off, the wheel would be useless, while in my case, if the pin should break, it could be easily replaced, and without difficulty.

Having thus fully described my invention, I claim as new and desire to secure by Letters Patent—

A sectional ratchet-wheel, secured upon its shaft by a steel pin passed through the shaft and entering orifices in the hub of the wheel, as and for the purpose specified.

Witness my hand this 27th day of March, A. D. 1876.

E. FOWLER STODDARD.

Witnesses:
W. H. CLARK,
CHAS. M. PECK.